US010944105B2

(12) United States Patent
Liu

(10) Patent No.: US 10,944,105 B2
(45) Date of Patent: Mar. 9, 2021

(54) LITHIUM ION BATTERY AND POSITIVE ACTIVE MATERIAL THEREOF

(71) Applicant: Contemporary Amperex Technology Co., Limited, Fujian (CN)

(72) Inventor: Hui Liu, Fujian (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 57 days.

(21) Appl. No.: 16/045,723

(22) Filed: Jul. 25, 2018

(65) Prior Publication Data

US 2019/0036117 A1    Jan. 31, 2019

(30) Foreign Application Priority Data

Jul. 26, 2017 (CN) .......................... 201710617141.1

(51) Int. Cl.
*H01M 4/505* (2010.01)
*H01M 4/525* (2010.01)
(Continued)

(52) U.S. Cl.
CPC ............ *H01M 4/505* (2013.01); *C01G 53/42* (2013.01); *C01G 53/50* (2013.01); *H01M 4/364* (2013.01);
(Continued)

(58) Field of Classification Search
CPC .. H01M 4/505; H01M 4/364; H01M 10/0525; H01M 4/525; H01M 4/485;
(Continued)

(56) References Cited

U.S. PATENT DOCUMENTS

2008/0090151 A1* 4/2008 Hosoya ................. H01M 4/131
429/223
2011/0240913 A1* 10/2011 Kim .................... C01G 45/1228
252/182.1
(Continued)

OTHER PUBLICATIONS

Huang et al. "Microscopically porous, interconnected single crystal LiNi1/3Co1/3Mn1/3O2 cathode material for lithium ion batteries." J. Mater. Chem., 2011, 21, 10777 (Year: 2011).*

*Primary Examiner* — Michael L Dignan

(57) ABSTRACT

The present invention provides a positive electrode active material includes a first lithium transition metal oxide represented by formula $Li_a(Ni_bCo_cMn_d)_{1-e}M_eO_2$ or $Li_a(Ni_b Co_cAl_d)_{1-e}M'_eO_2$, wherein $0.9<a<1.1$, $0.6 \leq b<0.9$, $0.1 \leq c<0.4$, $0.05 \leq d<0.4$, $0 \leq e \leq 0.1$, $b+c+d=1$, M is at least one of Al, Mg, Ti, Zr, M' is at least one of Mg, Ti, Zr, and a second lithium transition metal oxide represented by formula $Li_xNi_yCo_zM''_sO_2$, wherein $0.9<x<1.1$, $0.4 \leq y<0.6$, $0.2 \leq z<0.5$, $0.2 \leq s<0.5$, $y+z+s=1$, M'' is at least one of Mn, Al, Mg, Ti, Zr, Fe, Cr, V, Ti, Cu, B, Ca, Zn, Nb, Mo, Sr, Sb, W, Bi. The positive electrode active material for a lithium ion battery of the present invention shows a high compacted density. The present invention also provides a lithium ion battery using the positive electrode active material of the present invention. The lithium ion battery has high gram capacity, high energy density, good storage performance, and good cycle stability.

7 Claims, 2 Drawing Sheets

(51) Int. Cl.
    *H01M 10/0525*    (2010.01)
    *C01G 53/00*      (2006.01)
    *H01M 4/36*       (2006.01)
    H01M 10/0568      (2010.01)
    H01M 4/587        (2010.01)
    H01M 4/38         (2006.01)
    H01M 4/485        (2010.01)

(52) U.S. Cl.
    CPC ....... *H01M 4/525* (2013.01); *H01M 10/0525* (2013.01); *C01P 2004/03* (2013.01); *C01P 2004/61* (2013.01); *C01P 2006/80* (2013.01); *H01M 4/386* (2013.01); *H01M 4/485* (2013.01); *H01M 4/587* (2013.01); *H01M 10/0568* (2013.01)

(58) Field of Classification Search
    CPC .. H01M 4/386; H01M 4/587; H01M 10/0568; H01M 4/48; C01G 53/50; C01G 53/42; C01P 2004/61; C01P 2006/80; C01P 2004/03
    See application file for complete search history.

(56) References Cited

U.S. PATENT DOCUMENTS

| | | | |
|---|---|---|---|
| 2014/0002942 A1* | 1/2014 | Song | H01M 4/364 361/93.1 |
| 2014/0370390 A1* | 12/2014 | Choi | H01M 4/505 429/223 |
| 2015/0010824 A1* | 1/2015 | Sun | H01M 4/131 429/223 |

* cited by examiner

LITHIUM ION BATTERY AND POSITIVE ACTIVE MATERIAL THEREOF

BACKGROUND OF THE INVENTION

Cross-Reference to Related Application

The present patent application claims priority to Chinese patent application number 201710617141.1 filed on Jul. 26, 2017, the whole disclosure of which is incorporated herein by reference.

Field of the Invention

The present invention generally relates to batteries and, more particularly, to a lithium ion battery and a positive active material thereof.

Description of the Related Art

Compared with conventional lead-acid batteries, nickel hydrogen batteries and other secondary batteries, lithium ion batteries have advantages of high energy density, high output voltage, low self-discharge, no memory effect and environmental friendly, and thus have been widely used and developed. The performances of a lithium ion battery material determine the performances of the lithium ion battery. The research of positive materials has been focus of scientists. At present, $LiCoO_2$, $LiMnO_4$, $LiFePO_4$, $LiNi_xCo_yMn_{1-x-y}O_2$ and other positive electrode material have been extensively investigated.

At present, main positive electrode materials used in power batteries are $LiFePO_4$ and $LiNi_xCo_yMn_{1-x-y}O_2(x<0.5)$ which exhibit excellent electrochemical performances and safety performances. However, with the increasingly higher demands to energy density of the lithium ion batteries, $LiFePO_4$ and ternary materials with low nickel content represented by formula $LiNi_xCo_yMn_{1-x-y}O_2(x<0.5)$ cannot meet the demands of market due to low specific capacity. Nickel-rich ternary material represented by formula $LiNi_xCo_yMn_{1-x-y}O_2(x>0.8)$ has a high energy density, while the storage performance and safety performance of which still has not been solved, and it is difficult to be used in large-scale production. How to balance the energy density and storage gas production and safety performance of the positive electrode materials becomes a research hotspot in the art.

In view of the foregoing, what is needed, therefore, is to provide a lithium ion battery with desirable performances and a positive electrode active material thereof, so as to improve the energy density and safety performance of the lithium ion battery.

SUMMARY OF THE INVENTION

One object of the present invention is to overcome the disadvantages of the prior art, and provide a lithium ion battery having desirable performances and a positive active material thereof, so as to improve the energy density and safety performance of the lithium ion battery.

According to one embodiment of the present invention, a positive active material for a lithium ion battery includes a first lithium transition metal oxide represented by formula $Li_a(Ni_bCo_cMn_d)_{1-e}M_eO_2$ or $Li_a(Ni_bCo_cAl_d)_{1-e}M'_eO_2$ and a second lithium transition metal oxide represented by formula $Li_xNi_yCo_zM''_sO_2$, wherein $0.9<a<1.1$, $0.6\leq b<0.9$, $0.1\leq c<0.4$, $0.05\leq d<0.4$, $0\leq e\leq 0.1$, $b+c+d=1$, M is at least one of Al, Mg, Ti, Zr, M' is at least one of Mg, Ti, Zr, $0.9<x<1.1$, $0.4\leq y<0.6$, $0.2\leq z<0.5$, $0.2\leq s<0.5$, $y+z+s=1$, M'' is at least one of Mn, Al, Mg, Ti, Zr, Fe, Cr, V, Ti, Cu, B, Ca, Zn, Nb, Mo, Sr, Sb, W, Bi.

According to one aspect of the present invention, a weight ratio of the first lithium transition metal oxide to the second lithium transition metal oxide is 50:50 to 90:10.

When the weight ratio of the first lithium transition metal oxide to the second lithium transition metal oxide is less than 50:50, due to the content of the first lithium transition metal oxide represented by formula $Li_a(Ni_bCo_cMn_d)_{1-e}M_eO_2$ or represented by formula $Li_a(Ni_bCo_cAl_d)_{1-e}M'_eO_2$ $(0.6\leq b<0.9)$ is too low, the gram capacity of the hybrid positive electrode active material is low, the energy density of the lithium ion battery cannot be obviously improved. When the weight ratio of the first lithium transition metal oxide to the second lithium transition metal oxide is higher than 90:10, the content of the first lithium transition metal oxide is too high, the cycle stability and safety of the positive electrode active material are poor, thereby deteriorating the performances of the battery.

According to one aspect of the present invention, a weight ratio of the first lithium transition metal oxide to the second lithium transition metal oxide is 50:50 to 80:20.

For the first lithium transition metal oxide represented by formula $Li_a(Ni_bCo_cMn_d)_{1-e}M_eO_2$ or represented by formula $Li_a(Ni_bCo_cAl_d)_{1-e}M'_eO_2(0.6\leq b<0.9)$, the gram capacity is greater than 180 mAh/g, the energy density is high, while the structure is unstable, which has a poor interface stability with the electrolyte and leads to the following problems: (1) easy to swelling during high temperature storage, the capacity fading is too fast; (2) the capacity fading is also fast during the cycle process; (3) poor thermal stability, the lithium ion batteries are prone to thermal runaway under high temperature, overcharge, nail penetration and other conditions. For the second lithium transition metal oxide represented by formula $Li_xNi_yCo_zM''_sO_2(0.4\leq y<0.6)$, the gram capacity is less than 170 mAh/g, the energy density is relatively low, while the structure is stable and has a good interface stability with the electrolyte, therefore it has the following advantages: (1) low gas production during high temperature storage, high capacity retention rate; (2) high capacity retention rate during cycle process, long cycle life; (3) high thermal stability, the heat generated under high temperature, overcharge, nail penetration and other conditions is less, and the thermal runaway process is not easy to occur.

According to one aspect of the present invention, the first lithium transition metal oxide has a median particle size of $10~\mu m<D50\leq 20~\mu m$, and the second lithium transition metal oxide has a median particle size of $6~\mu m<D50\leq 10~\mu m$.

According to one aspect of the present invention, a compacted density of the positive electrode active material for the lithium ion battery is more than 3.4 $g/cm^3$.

$Li_xNi_yCo_zM''_sO_2(0.4\leq y<0.6)$ has a particle size of $6~\mu m<D50\leq 10~\mu m$, which may be a secondary particle or a primary particle, and can match and mix with the first lithium transition metal oxide represented by formula $Li_a(Ni_bCo_xMn_d)_{1-e}M_eO_2$ or represented by formula $Li_a(Ni_bCo_cAl_d)_{1-e}M'_eO_2(0.6\leq b<0.9)$ having a large median particle size D50 ($>10~\mu m$) through large-size balls and small-size balls, which can make full use of the gap between the particles and the particles, so that the compacted density can reach as high as more than 3.4 $g/cm^3$, thereby increasing the volumetric energy density effectively.

However, when the particle size of the first lithium transition metal oxide is larger than 20 μm, during the cold pressing process, the material having large particle size may be crushed easily due to large particle size, so that the test performance may be deteriorated. When the particle size of the first lithium transition metal oxide is less than 10 μm, the first lithium transition metal oxide cannot match the second lithium transition metal oxide effectively. When the particle size of the second lithium transition metal oxide is less than 6 μm, no effective match of the particle size is formed. In addition, the small particle size of the material leads to a larger specific surface area and more side reactions, which affects the properties of the material. When the particle size of the second lithium transition metal oxide is larger than 10 μm, the second lithium transition metal oxide cannot match with the first lithium transition metal oxide effectively and the test performance is reduced.

According to one aspect of the present invention, a particle of the second lithium transition metal oxide represented by formula $Li_xNi_yCo_zM''_sO_2$ is a single crystal particle. Because the stability of the surface of the single crystal particle material is higher, it is more conducive to improve the safety performance of the material.

According to one aspect of the present invention, in the second lithium transition metal oxide represented by formula $Li_xNi_yCo_zM''_sO_2$, $0.9<x<1.1$, $0.5 \leq y \leq 0.55$, $0.2 \leq z<0.5$, $0.2 \leq s<0.5$, $y+z+s=1$, M'' is Mn and/or Al.

According to another embodiment of the present invention, a lithium ion battery includes a positive electrode plate containing a positive electrode active material, a negative electrode plate containing a negative electrode active material, a separator interposed between the positive electrode plate and the negative electrode plate, and an electrolyte, wherein the positive electrode active material is the positive electrode active material as previously described.

According to one aspect of the present invention, the electrolyte includes a lithium salt, and the lithium salt is selected from at least one of $LiN(C_pF_{2p+1}SO_2)(C_qF_{2q+1}SO_2)$, $LiPF_6$, $LiBF_4$, LiBOB, $LiAsF_6$, $LiCF_3SO_3$, $LiClO_4$, wherein p, q is a natural number.

According to one aspect of the present invention, the electrolyte includes a non-aqueous organic solvent. The non-aqueous organic solvent includes propylene carbonate, and at least one of ethylene carbonate, dimethyl carbonate, diethyl carbonate, dipropyl carbonate, ethyl methyl carbonate, methyl propyl carbonate, vinylene carbonate, fluoroethylene carbonate, methyl formate, ethyl acetate, methyl butyrate, methyl acrylate, ethylene sulfite, propylene sulfite, dimethyl sulfite, diethyl sulfite, 1,3-propane sultone, ethylene sulfate, anhydrides, N-methyl pyrrolidone, N-methylformamide, N-methylacetamide, acetonitrile, N, N-dimethylformamide, sulfolane, dimethyl sulfoxide, dimethyl sulfide, γ-butyrolactone, tetrahydrofuran, fluorine-containing cyclic organic esters, sulfur-containing cyclic organic esters, unsaturated cyclic organic esters.

According to one aspect of the present invention, the negative electrode active material is selected from at least one of soft carbon, hard carbon, artificial graphite, natural graphite, silicon, silicon oxide compound, silicon carbon composite, lithium titanate, and a metal that can form an alloy with lithium.

Compared with common technologies, the lithium ion battery and positive electrode active material thereof of the present invention at least have the following technical effects:

The lithium ion battery positive electrode active material of the present invention is obtained by mixing the first lithium transition metal oxide represented by formula $Li_a(Ni_bCo_cMn_d)_{1-e}M_eO_2$ or represented by formula $Li_a(Ni_bCo_cAl_d)_{1-e}M'_eO_2 (0.6 \leq b<0.9)$ with the second lithium transition metal oxide represented by formula $Li_xNi_yCo_zM''_sO_2$ $(0.4 \leq y<0.6)$, which can overcome the shortcomings of the material itself and obtain a synergistic effect, thereby obtaining positive electrode active material having a high compacted density and increasing the volumetric energy density effectively. The lithium ion battery using the positive electrode active material of the present invention has a high gram capacity, high energy density, excellent storage performance and cycle stability. Heat generated under high temperature, overcharge, nail penetration and other conditions is less, and the thermal stability is high.

DETAILED DESCRIPTION OF THE PREFERRED EMBODIMENTS

Figure 1:
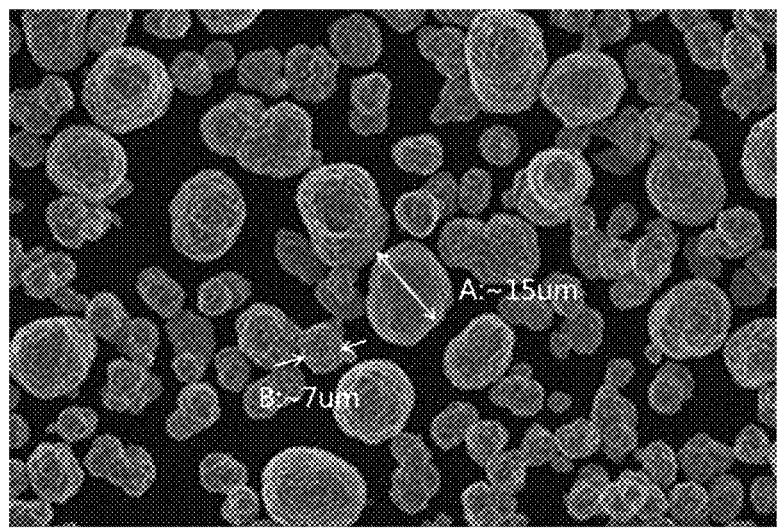
FIG. 1 depicts an SEM image of a positive electrode plate of Example 1 of the present invention.

Example embodiments of the present invention will now be described more fully hereinafter, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements.

Example 1

Preparation of Positive Electrode Plate

Dissolving the positive electrode active material (a weight ratio of $LiNi_{0.8}Co_{0.1}Mn_{0.1}O_2:LiNi_{0.5}Co_{0.2}Mn_{0.3}O_2$ is 70:30), the conductive agent of acetylene black, and the binder of polyvinylidene fluoride (PVDF) in a solvent of N-methylpyrrolidone at a weight ratio of 94:3:3 to obtain a mixture. Stirring and dispersing the mixture uniformly to obtain a positive electrode slurry. Coating the positive electrode slurry on an aluminum foil, drying and cold pressing the aluminum foil, and obtaining a positive electrode plate.

Preparation of Negative Electrode Plate

Fully and uniformly stirring and mixing a mixture of a negative electrode active material of artificial graphite, a conductive agent of acetylene black, a binder of styrene butadiene rubber(SBR), and a thickening agent of carbon methyl cellulose sodium (CMC) at a weight ratio of 95:2:2:1 in a solvent system of de-ionized water to obtain a negative electrode slurry; coating the negative electrode slurry on a copper foil, drying and cold pressing the copper foil, and obtaining a negative electrode plate.

Preparation of Separator

A PE porous polymer film is used as the separator.

Preparation of Electrolyte

Ethylene carbonate (EC), dimethyl carbonate (DMC), propylene carbonate (PC), ethyl methyl carbonate (EMC) are mixed at a weight ratio of 30:20:10:40 to obtain a mixture. $LiPF_6$ is added in the mixture to obtain an electrolyte having a concentration of 1.0 mol/L.

Preparation of Lithium Ion Battery

The positive electrode plate, the negative electrode plate were stacked with separator interposed therebetween and wound to obtain a cell core. The cell core is placed into an outer package. The outer package is sealed after the electrolyte as prepared is injected into the outer package.

The preparation and tests of Examples 2 to 20 and Comparative examples 1 to 2 are substantially the same as Example 1. The types of the positive electrode active material, particle size, weight ratio, the types of negative electrode active material, the composition of the electrolyte and the test results of each Example and each comparative example are shown in Tables 1 to 4.

Compacted Density Test

The positive electrode active material, the conductive agent of acetylene black, and the binder of polyvinylidene fluoride (PVDF) is dissolved in a solvent system of N-methylpyrrolidone at a weight ratio of 94:3:3, to obtain a mixture. The mixture is stirred and dispersed uniformly, to obtain the positive electrode slurry. The positive electrode slurry is coated on an aluminum foil, and the aluminum foil is dried, to obtain the positive electrode plate. The positive electrode plate is cold pressed under the same pressure and the thickness of the electrode plate is tested. The compacted density of the positive electrode active material is obtained according to the weight of the plate per unit area. The

TABLE 1

Types of the positive electrode active material, particle size, weight ratio, lithium salt, the negative electrode active material of Examples 1 to 20 and Comparative Examples 1 to 2

| | Positive electrode active material | | | | | | |
|---|---|---|---|---|---|---|---|
| | The first lithium transition metal oxide (A) | | The second lithium transition metal oxide (B) | | Weight | | Negative electrode |
| | Type | D50/ μm | Type | D50/ μm | ratio of (A):(B) | Lithium salt | active material |
| Comparative Example 1 | $LiNi_{0.8}Co_{0.1}Mn_{0.1}O_2$ | 14 | / | / | / | $LiPF_6$ | artificial graphite |
| Comparative Example 2 | / | / | $LiNi_{0.5}Co_{0.2}Mn_{0.3}O_2$ | 8 | / | $LiPF_6$ | artificial graphite |
| Example 1 | $LiNi_{0.8}Co_{0.1}Mn_{0.1}O_2$ | 15 | $LiNi_{0.5}Co_{0.2}Mn_{0.3}O_2$ | 7 | 70:30 | $LiPF_6$ | artificial graphite |
| Example 2 | $LiNi_{0.8}Co_{0.1}Mn_{0.1}O_2$ | 20 | $LiNi_{0.5}Co_{0.2}Mn_{0.3}O_2$ | 6 | 50:50 | $LiPF_6$ | artificial graphite |
| Example 3 | $LiNi_{0.8}Co_{0.1}Mn_{0.1}O_2$ | 10 | $LiNi_{0.5}Co_{0.2}Mn_{0.3}O_2$ | 8 | 40:60 | $LiPF_6$ | artificial graphite |
| Example 4 | $LiNi_{0.8}Co_{0.1}Mn_{0.1}O_2$ | 10 | $LiNi_{0.5}Co_{0.2}Mn_{0.3}O_2$ | 7 | 90:10 | $LiPF_6$ | artificial graphite |
| Example 5 | $LiNi_{0.8}Co_{0.1}Mn_{0.1}O_2$ | 10 | $LiNi_{0.5}Co_{0.2}Mn_{0.3}O_2$ | 7 | 95:5 | $LiPF_6$ | artificial graphite |
| Example 6 | $LiNi_{0.8}Co_{0.15}Al_{0.05}O_2$ | 15 | $LiNi_{0.5}Co_{0.2}Mn_{0.3}O_2$ | 10 | 50:50 | $LiBF_4$ | artificial graphite |
| Example 7 | $LiNi_{0.8}Co_{0.1}Mn_{0.1}O_2$ | 15 | $LiNi_{0.5}Co_{0.2}Mn_{0.25}Zr_{0.05}O_2$ | 7 | 50:50 | LiBOB | artificial graphite |
| Example 8 | $LiNi_{0.8}Co_{0.1}Mn_{0.1}O_2$ | 16 | $LiNi_{0.5}Co_{0.2}MN_{0.25}Mg_{0.05}O_2$ | 7 | 50:50 | $LiCF_3SO_3$ | natural graphite |
| Example 9 | $LiNi_{0.8}Co_{0.1}Mn_{0.1}O_2$ | 15 | $LiNi_{0.5}Co_{0.2}Mn_{0.3}O_2$ | 6 | 80:20 | $LiN(CF_3SO_2)_2$ | artificial graphite/ natural graphite |
| Example 10 | $LiNi_{0.6}Co_{0.2}Mn_{0.2}O_2$ | 14 | $LiNi_{0.5}Co_{0.2}Mn_{0.3}O_2$ | 7 | 50:50 | $LiPF_6/LiCF_3SO_3$ 1:1 | $SiO_2$ |
| Example 11 | $Li(Ni_{0.8}Co_{0.1}Mn_{0.1})_{0.95}Mg_{0.05}O_2$ | 15 | $LiNi_{0.5}Co_{0.2}Mn_{0.3}O_2$ | 7 | 50:50 | $LiPF_6$/LiBOB 1:1 | SiC |
| Example 12 | $Li(Ni_{0.8}Co_{0.1}Mn_{0.1})_{0.95}Zr_{0.05}O_2$ | 15 | $LiNi_{0.5}Co_{0.2}Mn_{0.3}O_2$ | 7 | 50:50 | $LiPF_6$ | artificial graphite/ SiC |
| Example 13 | $Li(Ni_{0.8}Co_{0.15}Al_{0.05})_{0.95}Zr_{0.05}O_2$ | 15 | $LiNi_{0.5}Co_{0.2}Mn_{0.3}O_2$ | 8 | 50:50 | $LiPF_6$ | artificial graphite/ SiC |
| Example 14 | $Li_{0.95}Ni_{0.6}Co_{0.1}Mn_{0.3}O_2$ | 15 | $LiNi_{0.52}Co_{0.2}Al_{0.28}O_2$ | 8 | 60:40 | $LiPF_6$ | hard carbon |
| Example 15 | $LiNi_{0.7}Co_{0.1}Mn_{0.2}O_2$ | 20 | $LiNi_{0.55}Co_{0.2}Mn_{0.25}O_2$ | 10 | 50:50 | $LiPF_6$ | SiC |
| Example 16 | $Li(Ni_{0.8}Co_{0.1}Mn_{0.1})_{0.95}Al_{0.05}O_2$ | 16 | $LiNi_{0.5}Co_{0.2}Mn_{0.25}Al_{0.0.05}O_2$ | 7 | 55:45 | $LiPF_6$ | artificial graphite |
| Example 17 | $LiNi_{0.8}Co_{0.1}Mn_{0.1}O_2$ | 15 | $LiNi_{0.4}Co_{0.2}Mn_{0.4}O_2$ | 8 | 50:50 | $LiPF_6$ | artificial graphite |
| Example 18 | $Li_{1.05}Ni_{0.65}Co_{0.3}Mn_{0.1}O_2$ | 15 | $Li_{0.95}Ni_{0.4}Co_{0.35}Al_{0.25}O_2$ | 8 | 60:40 | $LiPF_6$ | artificial graphite |
| Example 19 | $LiNi_{0.8}Co_{0.1}Mn_{0.1}O_2$ | 20 | $Li_{1.05}Ni_{0.55}Co_{0.2}Mn_{0.25}O_2$ | 10 | 50:50 | $LiPF_6$ | artificial graphite |
| Example 20 | $LiNi_{0.8}Co_{0.1}Mn_{0.1}O_2$ | 16 | $LiNi_{0.5}Co_{0.3}Fe_{0.2}O_2$ | 7 | 55:45 | $LiPF_6$ | artificial graphite | compacted density of each Example and each comparative example are shown in Table 2.

Specific Capacity Test 5 lithium ion batteries are taken from each comparative example and each example. The lithium ion battery is charged at a constant current of 0.33 C to 4.2V. The lithium ion battery is further charged at a constant voltage of 4.2V to a current of 0.05 C. The lithium ion battery is discharged at a constant current of 0.33 C to 2.8V, to obtain the discharge capacity. The specific capacity of the positive electrode active material was then obtained by dividing the discharge capacity by the mass of the positive electrode active material, and the test results are shown in Table 2.

High Temperature Storage Test 5 lithium ion batteries are taken from each comparative example and each example. The lithium ion battery is charged at a constant current of 0.33 C to 4.2V. The lithium ion battery is further charged at a constant voltage of 4.2V to a current of 0.05 C, so that the lithium ion battery is in a full charge state of 4.2V. The thickness of the lithium ion battery in the full charge state before storage is measured, and recorded as D0. Then the lithium ion battery in the full charge state is put in an oven at 85° C. Every 24 hours, the lithium ion battery was taken out from the oven, the thickness of the battery was measured immediately, and then put back in the oven at 85° C. Measuring the thickness of the lithium ion battery after storage for n days and recording as Dn.

The thickness expansion rate of the lithium ion battery before and after storage is calculated according to the following formula, $$\epsilon=(Dn-D0)/D0\times100\%;$$

The average thickness expansion rate of each group of batteries are shown in Table 2.

Cycle Performance Test 5 lithium ion batteries are taken from each comparative example and each example. The lithium ion battery was repeatedly charged and discharged through the following steps, and the discharge capacity retention rate of the lithium ion battery was calculated.

The lithium ion battery is charged at a constant current of 1 C at 25° C. to reach a voltage of 4.2V. The lithium ion battery is further discharged with a constant current of 1 C to reach a voltage of 2.8V. The foregoing process is taken as the first cycle process, and the resulting discharge capacity is the first discharge capacity. The lithium ion battery is repeatedly circulated several times according to the above conditions until the discharge capacity after the lithium ion battery cycle is less than or equal to 80% of the first discharge capacity. The number of cycles of the lithium ion battery is recorded.

The cycle capacity retention rate=(discharge capacity after cycle/discharge capacity of the first cycle)×100%.

TABLE 2

Test results of Examples 1 to 20 and Comparative Examples 1 to 2

| | Compacted density/ g/cm³ | Specific capacity/ mAh/g | Cycle stability (capacity fading to 80%) | Thickness expansion rate after being stored at 85° C. for 10 days |
|---|---|---|---|---|
| Comparative Example 1 | 3.2 | 196.5 | 500 | 57.8% |
| Comparative Example 2 | 3.3 | 150.2 | 1800 | 12.5% |
| Example 1 | 3.5 | 179.1 | 1450 | 25.7% |
| Example 2 | 3.6 | 171.2 | 1520 | 21.2% |
| Example 3 | 3.5 | 157.6 | 1630 | 16.5% |
| Example 4 | 3.4 | 189.5 | 810 | 39.5% |
| Example 5 | 3.2 | 192.4 | 650 | 50.5% |
| Example 6 | 3.5 | 171.5 | 1550 | 18.7% |
| Example 7 | 3.6 | 171.2 | 1580 | 18.3% |
| Example 8 | 3.6 | 172.0 | 1520 | 18.5% |
| Example 9 | 3.4 | 185.5 | 925 | 32.6% |
| Example 10 | 3.6 | 172.5 | 1830 | 17.3% |
| Example 11 | 3.6 | 171.4 | 1650 | 19.2% |
| Example 12 | 3.6 | 172.3 | 1620 | 15.6% |
| Example 13 | 3.6 | 172.8 | 1720 | 15.2% |
| Example 14 | 3.6 | 175.0 | 1688 | 16.7% |
| Example 15 | 3.4 | 173.5 | 1720 | 17.5% |
| Example 16 | 3.5 | 175.5 | 1725 | 20.6% |
| Example 17 | 3.5 | 179.0 | 1740 | 19.3% |
| Example 18 | 3.4 | 178.4 | 1650 | 19.2% |
| Example 19 | 3.6 | 180.0 | 1680 | 18.8% |
| Example 20 | 3.6 | 176.0 | 1620 | 20.5% |

Result Discussion

FIG. 1 depicts an SEM image of a positive electrode plate of Example 1. It can be seen from the SEM image that the particle size of the $LiNi_{0.8}Co_{0.1}Mn_{0.1}O_2$ material is about 15 μm and the particle size of the $LiNi_{0.5}Co_{0.2}Mn_{0.3}O_2$ material is about 7 μm. Via using the large-sized balls and the small-sized balls, the positive active material can make good use of the gap between particles and particles, which can increase the volumetric energy density effectively.

Figure 2:
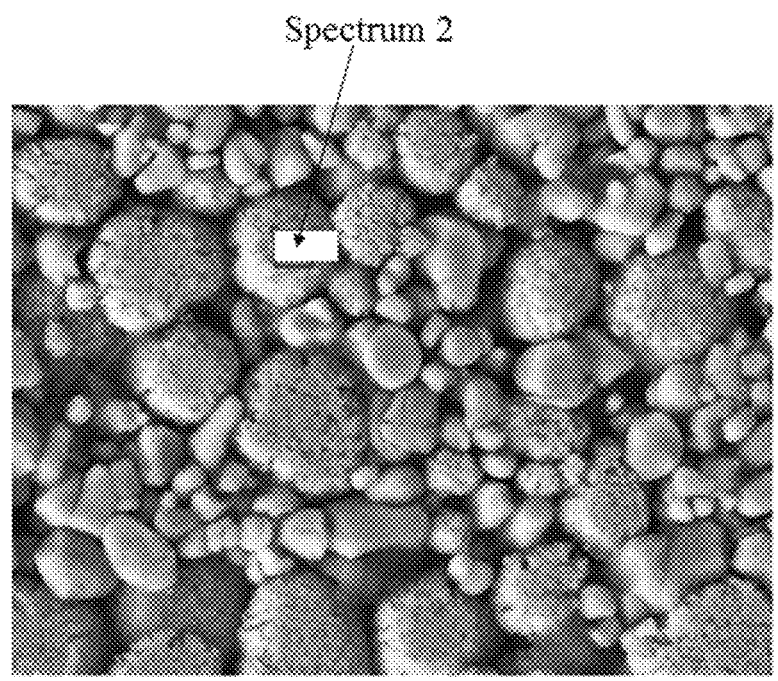
FIG. 2 depicts an EDS image of a first lithium transition metal oxide in a positive electrode active material of Example 2 of the present invention.

FIG. 2 depicts an EDS image of a first lithium transition metal oxide in a positive electrode active material of Example 2. Table 3 shows the element composition of the first lithium transition metal oxide (large particle) at the position marked a "Spectrum 2" in FIG. 2. The transition metal content of the large particle is Ni:Co:Mn=20.55:3.30:2.00.

TABLE 3

The content of the element of the first lithium transition metal oxide in Example 2

| Element | Weight percentage | Atomic percentage |
|---|---|---|
| C | 6.78 | 14.88 |
| O | 35.95 | 59.27 |
| Mn | 4.16 | 2.00 |
| Co | 7.37 | 3.30 |
| Ni | 45.75 | 20.55 |

Figure 3:
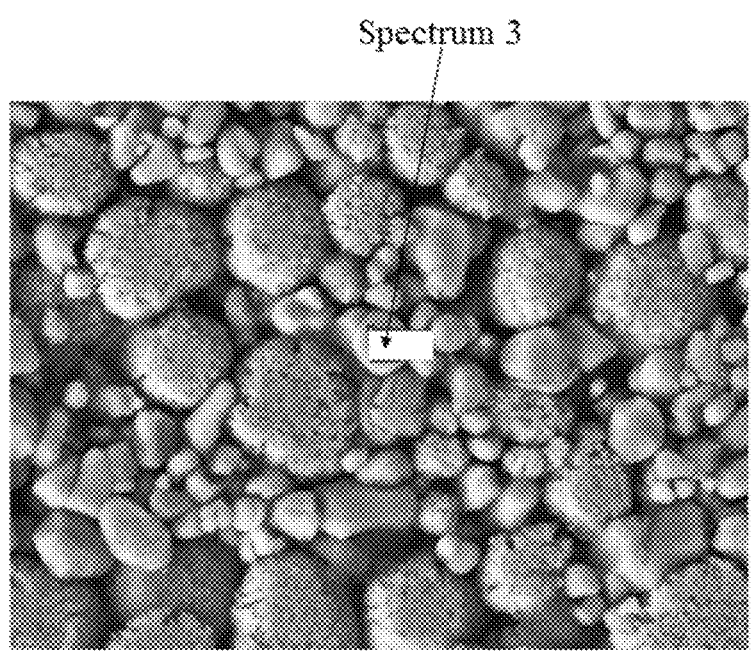
FIG. 3 depicts an EDS image of a second lithium transition metal oxide in a positive electrode active material of Example 2 of the present invention.

FIG. 3 depicts an EDS image of a second lithium transition metal oxide in a positive electrode active material of Example 2. Table 4 shows the element composition of the second lithium transition metal oxide (small particle) at the position marked a "Spectrum 3" in FIG. 3. The transition metal content of the small particle is Ni:Co:Mn=11.96:4.72:6.90.

TABLE 4

Content of the element of the second lithium transition metal oxide in Example 2

| Element | Weight percentage | Atomic percentage |
|---|---|---|
| C | 7.89 | 16.59 |
| O | 36.08 | 56.95 |
| Mn | 15.02 | 6.90 |
| Co | 11.02 | 4.72 |
| Ni | 27.82 | 11.96 |

As can be seen from FIGS. 2 and 3, the positive electrode active material in Example 2 contains large particles of $LiNi_{0.8}Co_{0.1}Mn_{0.1}O_2$ and small particles of $LiNi_{0.5}Co_{0.2}Mn_{0.3}O_2$.

Comparison Between Examples 1 to 20 and Comparative Examples 1 to 2

Compared with Comparative Example 1, except for Example 5, the compacted density of the hybrid positive electrode active materials in other examples has been improved, indicating that the first lithium transition metal oxide can match with the second lithium transition metal oxide in the hybrid positive electrode active material effectively.

Comparison Between Examples 1 to 4 and Comparative Example 1

The lithium ion batteries were stored at 85° C. for 10 days, compared with Comparative Example 1, the expansion rate of the hybrid positive electrode active materials of Examples 1 to 4 decreases obviously, and the expansion rate decreases with the increase of the content of the second lithium transition metal oxide in the hybrid positive electrode active material. The low expansion rate indicates that the gas production is less, and further indicates that the hybrid positive electrode active material can improve the high temperature storage stability of the lithium ion battery.

Comparison Between Examples 1 to 20 and Comparative Example 2

Compared with Comparative Example 2, the specific capacity of Examples 1 to 20 is higher than that of Comparative Example 2. Since the content of the first lithium transition metal oxide in Example 3 is relatively low, the specific capacity does not increase significantly, while the specific capacity of other Examples has been improved significantly.

Comparison Between Examples 1 to 20

As can be seen from comparison between Examples 1 to 20, due to the weight ratio of the first lithium transition metal oxide to the second lithium transition metal oxide is 95:5 in Example 5, the cycle stability and the high temperature storage stability of the lithium ion battery are very poor. When the weight ratio of the first lithium transition metal oxide to the second lithium transition metal oxide in Example 4 is reduced to 90:10, the cycle stability and the high temperature storage stability of the lithium ion battery are somewhat improved. When the weight ratio of the first lithium transition metal oxide to the second lithium transition metal oxide is reduced to 80:20 in Example 9, the cycle stability and the high temperature storage stability are significantly improved. When the weight ratio of the first lithium transition metal oxide to the second lithium transition metal oxide is reduced to 50:50, the cycle stability and high temperature storage stability are desirable. However, when the weight ratio of the first lithium transition metal oxide to the second lithium transition metal oxide in Example 3 is reduced to 40:60, the cycle stability and the high temperature storage stability of the lithium ion battery are good, while the specific capacity of the lithium ion battery is low.

Summarizing the above, when the weight ratio of the first lithium transition metal oxide to the second lithium transition metal oxide is in a range of 50:50 to 90:10, the cycle stability and safety performance of the lithium ion battery are good, and the specific capacity of the battery can also reach a higher level. When the weight ratio of the first lithium transition metal oxide to the second lithium transition metal oxide exceeds the range of 50:50 to 90:10, some properties of the lithium ion battery can be improved, but the improvement effect is not obvious.

Compared with common technologies, the lithium ion battery and positive electrode active material thereof of the present invention at least have the following advantages:

The lithium ion battery positive electrode active material of the present invention is obtained by mixing the first lithium transition metal oxide represented by formula $Li_a(Ni_bCo_cMn_d)_{1-e}M_eO_2$ or $Li_a(Ni_bCo_cAl_d)_{1-e}M'_eO_2$ (0.6≤b<0.9) with the second lithium transition metal oxide represented by formula $Li_xNi_yCo_zM''_sO_2$ (0.4≤y<0.6), which can overcome the shortcomings of the material itself, and obtain a synergistic effect. Therefore, the obtained positive electrode active material has a high compacted density, which can increase the volumetric energy density effectively. The lithium ion battery using the positive electrode active material of the present invention has a high gram capacity, high energy density, excellent storage performance and cycle stability, the heat generated under high temperature, overcharge, nail penetration and other conditions is less, and the thermal stability is high.

Many modifications and other embodiments of the inventions set forth herein will come to mind to one skilled in the art to which these inventions pertain having the benefit of the teachings presented in the foregoing descriptions. Therefore, it is to be understood that the inventions are not to be limited to the specific embodiments disclosed and that modifications and other embodiments are intended to be included within the scope of the appended claims. Moreover, although the foregoing descriptions describe example embodiments, it should be appreciated that alternative embodiments without departing from the scope of the appended claims. Although specific terms are employed herein, they are used in a generic and descriptive sense only and not for purposes of limitation.

What is claimed is:

1. A positive active material for a lithium ion battery, comprising:
   a first lithium transition metal oxide represented by formula $Li_a(Ni_bCo_cMn_d)_{1-e}M_eO_2$ or $Li_a(Ni_bCo_cAl_d)_{1-e}M'_eO_2$, wherein 0.9<a<1.1, 0.6≤b<0.9, 0.1≤c<0.4, 0.05≤d<0.4, 0≤e≤0.1, b+c+d=1, M is at least one of Al, Mg, Ti, Zr, M' is at least one of Mg, Ti, Zr, and
   a second lithium transition metal oxide represented by formula $Li_xNi_yCo_zM''_sO_2$, wherein 0.9<x<1.1, 0.4≤y<0.6, 0.2≤z<0.5, 0.2≤s<0.5, y+z+s=1, M'' is at least one of Al, Mg, Ti, Zr, Fe, Cr, V, Cu, B, Ca, Zn, Nb, Mo, Sr, Sb, W, Bi, and wherein a weight ratio of the first lithium transition metal oxide to the second lithium transition metal oxide is 50:50 to 60:40.

2. The positive active material of claim 1, wherein the first lithium transition metal oxide has a median particle size of 10 μm<D50≤20 μm, and the second lithium transition metal oxide has a median particle size of 6 μm<D50≤10 μm.

3. The positive active material of claim 1, wherein a compacted density of the positive electrode active material is more than 3.4 g/cm$^3$.

4. The positive active material of claim 1, wherein in the second lithium transition metal oxide represented by formula $Li_xNi_yCo_zM''_sO_2$, 0.9<x<1.1, 0.5≤y≤0.55, 0.2≤z<0.5, 0.2≤s<0.5, y+z+s=1, M'' is Al.

5. A lithium ion battery, comprising a positive electrode plate containing a positive active material, a negative electrode plate containing a negative active material, a separator interposed between the positive electrode plate and the negative electrode plate, and an electrolyte, wherein the positive active material is the positive active material of any one of claim 1.

6. The lithium ion battery of claim 5, wherein the electrolyte comprises a lithium salt, and the lithium salt is selected from at least one of $LiN(C_pF_{2p+1}SO_2)(C_qF_{2q+1}SO_2)$, $LiPF_6$, $LiBF_4$, LiBOB, $LiAsF_6$, $LiCF_3SO_3$, $LiClO_4$, wherein p, q is a natural number.

7. The lithium ion battery of claim 5, wherein the negative active material is selected from at least one of soft carbon, hard carbon, artificial graphite, natural graphite, silicon, silicon oxide compound, silicon carbon composite, lithium titanate, and a metal that can form an alloy with lithium.

* * * * *